United States Patent
Harris et al.

(10) Patent No.: US 7,926,567 B2
(45) Date of Patent: Apr. 19, 2011

(54) METHOD FOR CONTROLLED GELATION OF SILICATES

(75) Inventors: Ralph Edmund Harris, Guildford (GB); Ian Donald McKay, Guildford (GB)

(73) Assignee: Cleansorb Limited, Surrey (GB)

( * ) Notice: Subject to any disclaimer, the term of this patent is extended or adjusted under 35 U.S.C. 154(b) by 640 days.

(21) Appl. No.: 11/919,495

(22) PCT Filed: May 2, 2006

(86) PCT No.: PCT/GB2006/001584
§ 371 (c)(1),
(2), (4) Date: Nov. 13, 2007

(87) PCT Pub. No.: WO2006/117535
PCT Pub. Date: Nov. 9, 2006

(65) Prior Publication Data
US 2009/0314493 A1   Dec. 24, 2009

(30) Foreign Application Priority Data
Apr. 29, 2005   (GB) .................................. 0508732.5

(51) Int. Cl.
*E21B 43/16*   (2006.01)

(52) U.S. Cl. ......... 166/300; 166/293; 166/369; 507/203
(58) Field of Classification Search ........................ None
See application file for complete search history.

(56) References Cited

U.S. PATENT DOCUMENTS

| | | | |
|---|---|---|---|
| 3,817,766 A | 6/1974 | Bonin | |
| 4,534,412 A * | 8/1985 | Dovan et al. | 166/295 |
| 4,665,985 A | 5/1987 | Berrod et al. | |
| 4,759,665 A | 7/1988 | Burkhardt et al. | |
| 4,986,353 A | 1/1991 | Clark et al. | |
| 4,986,355 A | 1/1991 | Casad et al. | |
| 5,278,256 A | 1/1994 | Bellis | |
| 2006/0086501 A1 * | 4/2006 | Creel et al. | 166/281 |
| 2006/0234871 A1 * | 10/2006 | Dalrymple et al. | 507/211 |

OTHER PUBLICATIONS

Biodegradable Polymers as Drug Delivery Systems, edited by Chasin & Langer, Marcel Dekker Inc., NY, Basel and Hong Kong, p. 4, lines 24 to 26 and p. 6, lines 20-21; 1990.
International Search Report mailed Jul. 11, 2006.

* cited by examiner

*Primary Examiner* — Zakiya W. Bates
(74) *Attorney, Agent, or Firm* — Nixon & Vanderhye P.C

(57) ABSTRACT

A process for forming a gel, which process comprises mixing an alkaline silicate solution with a polymer in solid form, the polymer being capable of being converted by hydrolysis into one or more organic acids; and allowing the polymer to release sufficient acid to cause formation of a silicate gel.

25 Claims, No Drawings

METHOD FOR CONTROLLED GELATION OF SILICATES

This application is the U.S. national phase of International Application No. PCT/GB2006/001584 filed 2 May 2006 which designated the U.S. and claims priority to GB 0508732.5 filed 29 Apr. 2005, the entire contents of each of which are hereby incorporated by reference.

Gels are commonly used in a variety of industrial situations. For example, gels may be used in oil and gas production operations for the purpose of water or gas shut off, as a kill pill, for the control of coning, for permeability reduction, to seal off fractures or thief zones, for profile improvement during water, polymer, surfactant, steam or gas flooding, for temporary or permanent blocking of the wellbore or for sealing off the formation or wellbore during the abandonment of wells.

Gels may also find application in tunneling operations, as grouts or sealants, in the preparation of moulds for foundry applications, or in numerous other industrial applications well known to those skilled in the art.

Placement of a gel which has already been formed may be problematic. For example, in oilfield applications it may be very difficult or not possible to inject a gel, even into a high permeability underground formation. The extent of penetration of a preformed gel may be limited. There are therefore advantages if a gel can be formed in-situ.

A range of useful gels may be formed from silicates such as sodium silicates. Gels may also be formed from chemically modified silicates. Silicates are generally cheap and readily available. Gels may be produced from alkaline silicate solutions by adding acid. This reduces the pH and results in gel formation. Direct addition of acid results in rapid gel formation.

Slower gelation of silicates may be achieved by the addition of an ester to a silicate. In this case alkaline hydrolysis of the ester occurs, resulting in acid production and a decrease in the pH leading to gel formation. There can be a delay of several minutes or tens of minutes before the formation of a gel, depending on the ester used, the initial pH of the silicate and the temperature.

Where it is desirable to form a gel in-situ, rapid gel formation may be undesirable as the gel may be formed prematurely. For example in oilfield situations, attempts have been made to inject silicate and acid or ester as separate stages, which undergo mixing in the underground reservoir and generate a gel. However, efficient mixing may not readily be achieved, especially where plug flow occurs.

It would be advantageous to be able to gel silicates in a reliable and predictable manner and over longer periods than can be provided by direct addition of acid or ester to silicates. Longer setting times would, for example, enable silicate solutions to be placed further into an underground wellbore or formation before gelation occurred. Longer set times would also be an advantage in producing foundry moulds for large items, where set times of a few hours are desirable.

It is the object of the current invention to provide a process for the controlled gelation of silicates over a range of temperatures and setting times.

It is a further object of the current invention to provide a process where the controlled gelation of silicates takes place over a longer period than can be achieved with previous methods of acidifying silicate solutions.

Accordingly, the present invention provides a process for forming a gel, which process comprises: (a) mixing an alkaline silicate solution with a polymer in solid form, the polymer being capable of being converted by hydrolysis into one or more organic acids; and (b) allowing the polymer to release sufficient acid to cause formation of a silicate gel.

The process of the present invention may be used in any situation where it is desirable to achieve a controlled gelation of silicate. For example in grouts and sealants, the preparation of foundry moulds or other types of moulds and in oilfield applications. Oilfield applications may include, but are not limited to, the production of gels in underground hydrocarbon-bearing formations for the purpose of water or gas shut off, as a kill pill, for the control of coning, for the sealing of fractures or thief zones, for modification of sweep profiles, for temporary or permanent blocking of the wellbore or for general sealing of the formation or wellbore as part of the process of abandonment. Other oil industry applications of the process will be apparent to those skilled in the art.

The process of the present invention may also be used to produce silicate gels for application in the plugging of pipelines or the preparation of moulds for foundry applications, such as moulds based on the use of sand. The process may also be used as part of a tunneling operation or as a remedial treatment on a tunnel. Further, it may be used in other grouting or sealing applications or in any other situations where silicate gels are of use.

The polymer used in the process of the present invention is any solid polymer which hydrolyses in the presence of water to generate an organic acid or acids. Typically the polymer is a polyester, typically an aliphatic polyester. Most preferably the polyester is selected from the group which can be synthesised by suitable processes known to those skilled in the art, including the ring opening melt condensation of lactide (lactic acid cyclic dimer), glycolide (glycolic acid cyclic dimer) and caprolactone. Suitable polymers include polymers which incorporate lactide, glycolide or caprolactone, with or without other monomers. Specific examples include polylactide (polylactic acid), polyglycolide (polyglycolic acid), lactide-glycolide copolymer, lactide-caprolactone copolymer, glycolide-caprolactone copolymer and lactide-glycolide-caprolactone copolymer. Suitable polymers also include homopolymers or copolymers of lactic acid, lactide (dimer of lactic acid), hydroxyacetic acid (glycolic acid) glycolide (dimer of glycolic acid) and copolymers of lactic acid and/or glycolic acid with one or more other compounds containing hydroxy-, carboxylic-, or hydroxycarboxylic acid moieties.

U.S. Pat. No. 4,986,353 provides examples of suitable monomers with which lactic acid or glycolic acid may be condensed. Suitable monomers include but are not limited to tribasic acids such as citric acid, dibasic acids such as adipic acid, and diols such as ethylene glycol and polyols. They also include difunctional molecules such as 2,2-(bishydroxymethyl) propanoic acid. Preferred co-condensing molecules according to the process of U.S. Pat. No. 4,986,353 are citric acid, 2,2-(bishydroxymethyl) propanoic acid, trimethylolethane, and adipic acid.

These, or any other monomers may also be incorporated into the polymers according to the process of the present invention as long as the solid polymer undergoes hydrolysis in the presence of water to generate an organic acid or acids. Acid production is from simple hydrolysis of ester linkages in the polyester.

Polymers which hydrolyse to produce lactic acid and/or glycolic acid are preferred. Particularly preferred polymers are aliphatic polyesters selected from the group which can be synthesised by the condensation of one or more of lactic acid, glycolic acid, lactide (dimer of lactic acid) glycolide (dimer of glycolic acid) and caprolactone. Hydrolysis of a polymer wherein lactic acid or lactide has been incorporated by condensation produces lactic acid and hydrolysis of a polymer wherein glycolic acid or glycolide has been incorporated by condensation produces glycolic acid.

The composition of the polymer or copolymer is a principal determinant of the hydrolysis rate of the polymer. A composition which will give the required rate of hydrolysis under the temperature conditions at which gelation of silicates is required will generally be selected.

The rate of hydrolysis at a given temperature may be determined by selecting an appropriate polymer composition and form of presentation of the solid polymer (size and shape of the solids).

Hydrolysis of the polymer is by bulk erosion (Biodegradable Polymers as Drug Delivery Systems, Edited by Mark Chasin and Robert Langer. Marcel Dekker Inc., New York, Basel and Hong Kong, 1990).

The rate of hydrolysis is primarily influenced by four key variables; monomer stereochemistry (D or L form), co-monomer ratio, polymer chain linearity and polymer molecular weight. Smaller particles of a polymer of a given composition at a given temperature have a larger surface area per unit weight so will produce acid at a faster rate. In general, polylactic acid and other lactic acid rich polymers will degrade at a slower rate than polyglycolic acid and glycolic acid rich polymers.

In lower temperature applications, typically up to about 70° C., for instance from about 20° C. to about 70° C., polyglycolic acid and glycolic acid rich polymers (i.e. polymers in which glycolic acid represents over 50% of the constituent monomers of the polymer) will generally be used in the process of the present invention. Above 70° C., for instance from about 80° to 170° C., polylactic acid and other lactic acid rich polymers (i.e. polymers in which lactic acid represents over 50% of the constituent monomers of the polymer) will generally be used in the process of the invention.

Incorporation of caprolactone into the polymers can increase their rate of hydrolysis at a given temperature. The rate of hydrolysis of the polymers may also be influenced by the extent of block or random structure in copolymers, by chemical modification of the end groups of the polymer or by the introduction of branching into the polymers, for example by incorporating polyols into the polymer.

The rate of depolymerisation may also be increased by incorporating specific chemicals such as quaternary ammonium compounds into the polyesters (U.S. Pat. No. 5,278, 256).

The type of organic acid, amount of acid delivered and rate of acid production at a given temperature may be determined by selecting an appropriate polymer composition and form of presentation of the solid polymer (size and shape of the solids).

The amount of solid polymer incorporated into the silicate solution will be an amount sufficient to gel the silicate within the intended timescale. Gel formation will be a consequence of acid produced from the hydrolysis of at least part of the polymer.

The polymer may also incorporate by dissolution, dispersion or encapsulation, other materials, organic chemicals, inorganic chemicals, or catalysts. When the polymer dissolves these other materials, organic chemicals, inorganic chemicals or catalysts may be released at a controlled rate coincident with acid production. One function of the added materials is to adjust the specific gravity of the solid polymer to the desired value. Preferred materials for adjusting the specific gravity include water-soluble alkali metal salts and other salts. For oilfield applications, the water-soluble alkali metal salts and other salts may be those salts such as are commonly used for adjusting the specific gravity of oilfield brines. Another function of the added materials may be to contribute to the formation of the gel or enhance the properties of the gel formed.

The polymers may be used in any solid configuration, including, but not being limited to spheres, cylinders, cuboids, fibres, powders, beads, sheets, prills or any other configuration which can be placed in contact with the silicate. The particle size of the polymer is typically from 0.1 µm to 4.5 mm, for instance from 0.1 µm to 4 mm. More typically the polymer is used in the form of a powder or spherical particles in the size range 0.1 µm to 2 mm, most preferably 10 µm to 200 µm. The polymer will therefore normally be present as a slurry or suspension in the silicate solution.

Polymers of the desired size and shape may be prepared by any suitable process known to those skilled in the art including, but not being limited to, high shear dispersion of the polymer melt, emulsification followed by solvent evaporation, desolvation, spray drying or grinding. Some suitable processes of producing microparticles, microspheres, microcapsules, shaped particles and fibres are reviewed in Chasin, M and Langer, R. (Eds.). Biodegradable Polymers as Drug Delivery Systems. Marcel Dekker Inc., New York, (1990). U.S. Pat. No. 4,986,355 teaches a process of preparing suitably sized polyester particles for use as a fluid loss additive or as a gel breaker in a subterranean formation.

In general it is desirable to avoid the use of chlorinated solvents in solvent-based methods of producing the particles of the desired size and shape. For example methylene chloride has been used to produce micro-particles of polyesters such as polylactide for use in drug delivery applications, but significant amounts of methylene chloride may be present in the micro-particles even after drying. The presence of chlorinated solvents will reduce the otherwise excellent environmental acceptability of the polyesters. The solubility of polyesters in non-chlorinated solvents is generally limited.

The silicate solution used will be any silicate which can form a gel in acid conditions. Suitable silicates will be well known to those skilled in the art. The concentration of silicate selected will be sufficient to give a gel with acceptable properties after acidification of the solution with the polymer. The concentration of $SiO_2$ will generally be from 1.0% to 10.0% w/v although higher or lower concentrations may be used if a gel with properties suitable for the specific application is formed. The initial pH of the silicate solution is generally high enough to prevent the generation of a gel prior to the production of acid from the polymer. Typically the silicate solution contains a controlled quantity of a base agent. Examples of suitable base agents include sodium hydroxide and sodium oxide.

Formulations are normally designed so that the hydrolysis of the solid polymer and subsequent gelation of the silicate solution occurs over a period of 10 to 600 minutes, although hydrolysis of the polymer over a shorter or longer period may be desirable in some circumstances. However, the time taken to achieve gelation will in most cases be longer than the time taken to gel the silicate solution with conventional acids or esters. Gelation occurs after a predetermined period of time, for a given temperature, polymer composition, polymer particle size distribution and shape and silicate composition. If even distribution of polymer throughout the silicate solution is achieved, gelling will be homogeneous throughout the silicate solution.

All chemicals required for the process of the present invention will normally be technical grade to reduce the cost of the process.

In most cases it is desirable to incorporate the polymer into the silicate solution. There are certain circumstances where it may be possible or desirable to form a gel from two separate fluids, one containing a dispersion of the polymer and one the silicate solution. For example, for producing a gel in certain underground formations, an aqueous dispersion of the polymer may be introduced ahead of the silicate. The polymer may lodge in the pore throats and subsequent placement of the silicate in proximity to the polymer will result in gel formation. The mobility of different particle size distribution populations of polymers through different types of formation will be known to those skilled in the art and will be taken into account in designing the specific treatment method.

Where the process is used to form a gel in an underground reservoir to assist in oil and gas production operations it may be used in reservoirs found in all types of rock formation from which water and hydrocarbons, for example oil or gas, are generally recovered. The gas may be, for example, methane, ethane or butane.

Oil, gas or water is recovered from underground reservoirs by drilling a well bore into the reservoir and extracting the oil, gas or water. The well bore serves as a convenient means for introducing the mixture of the silicate and polymer into the reservoir according to the method of the present invention. In addition to introduction through producing wells the mixture of the silicate solution and polymer may be introduced through injector wells. The producer or injector wells may be vertical, deviated, inclined or horizontal.

Use of polymer particles with a lower mean particle size will facilitate penetration of the fluid into lower permeability formations.

One consequence of the presence of the polymer particles in the fluid is that the polymer may also function as a particulate diverting agent during placement of the fluid into underground formations. This will be a function of the particle size distribution of the polymer and also the permeability and pore throat size distribution of the formation and will be well understood by those skilled in the art.

Silicate gel produced in an underground reservoir may assist in the recovery of oil, gas or water through a number of different mechanisms. These may include, but not be limited to, water or gas shut off, use as a kill pill, the control of coning, permeability reduction, the sealing off of fractures or thief zones, profile improvement during water, polymer, surfactant, steam or gas flooding. The method may also be used for grouting, to achieve temporary blocking of the wellbore or for sealing off of the formation or wellbore during the abandonment of wells.

The method of the present invention may also be used to produce silicate gels in tunneling operations, to block pipelines, as grouts or sealants (for example in building applications) or in the production of moulds for foundry applications. The applicability of the gelling method to other situations where silicate gels are used will be apparent to those skilled in the art.

To prepare the silicate solution incorporating the polymer for introduction into underground reservoirs it may be prepared batchwise in tanks or other suitable vessels by adding the polymer (and any other materials or additives deemed to be useful) to the silicate solution and achieving sufficient mixing by recirculating the solution through a blender such as a paddle blender for a suitable period of time. It may also be prepared by adding the polymer (and any other materials or additives deemed to be useful) to the silicate solution on a continuous, preferably carefully controlled and monitored basis ("on the fly") as the formulation is injected into the underground reservoir. Other methods of preparing the chosen formulation for introduction into underground reservoirs will be well known to those skilled in the art.

Suitable methods for preparing silicate solutions incorporating the polymer for use in other applications such as tunneling operations, the blocking of pipelines, as grouts or sealants, in the production of moulds for foundry applications or any other situations where silicate gels are or may be used will be apparent to those skilled in the art.

Advantages of the method include; the ability to vary the set time over much longer periods than are obtained with previous methods based on the direct addition of acid or ester to silicates; the ability to formulate the polymer to give the desired rate of acid generation at a particular temperature is another advantage, allowing the method to be tailored to the requirements of individual situations. Together, these permit more time in which to work with the solution before the gel is formed. This is a particular advantage where it is desirable to produce a gel in an underground formation or other situation where it may take some time to place the fluid. The use of highly corrosive concentrated acids can also be avoided which gives operational and health and safety benefits. The polymers are a convenient low hazard form of concentrated acid and can be stored indefinitely in the absence of water. The polymers are of low environmental impact. At ambient temperature they hydrolyse slowly to readily biodegradable components.

The process of the invention is further illustrated in the following Example:

EXAMPLE 1

2.5 ml of sodium silicate solution (Sigma S-1773; approximately 27% $SiO_2$ in 14% NaOH) was added to 15 ml of distilled water. 1 g of polyglycolic acid of average size 10-20 microns was added and the solution incubated at room temperature (20° C.) for one hour. No gelation was observed to occur. When the same formulation was incubated at 60° C. gelation occurred after about one hour.

Controls run at room temperature indicated that when an equivalent amount of glycolic acid was added to the silicate solution rather than polyglycolic acid this resulted in the immediate precipitation of silicate and slow formation of a gel overnight. Addition of 2 ml of triacetin to the silicate solution rather than polyglycolic acid resulted in the formation of a gel after about 30 minutes.

This Example illustrates that use of polymer can increase the time taken to gel silicates compared to the addition of an acids or esters.

The invention claimed is:

1. A process for forming a gel, which process comprises:
   mixing an alkaline silicate solution with a polymer in solid form, the polymer being capable of being converted by hydrolysis into one or more organic acids; and
   allowing the polymer to release sufficient acid to cause formation of a silicate gel.

2. A process according to claim 1 wherein the polymer is a polyester.

3. A process according to claim 1, wherein the polymer comprises monomeric units derived from one or more of lactic acid, lactide, glycolic acid, glycolide and caprolactone, and from one or more other monomers.

4. A method according to claim 1, wherein the polymer is polylactic acid, polylactide, polyglycolic acid or polyglycolide.

5. A process according to claim 1, wherein the polymer takes the form of a sphere, cylinder, cuboid, fibre, powder, bead or other configuration.

6. A process according to claim 1, wherein the polymer has a particle size in the range of 0.1 µm to 4 mm.

7. A process according to claim 1, wherein hydrolysis of the polymer produces lactic or glycolic acid.

8. A process according to claim 1, wherein the polymer comprises one or more other materials, chemicals or catalysts which are incorporated into the polymer by dissolution or dispersion to allow their controlled release coincident with acid production.

9. A process according to claim 1, wherein the polymer comprises one or more other materials, chemicals or catalysts which are incorporated into the polymer to modify the specific gravity to a desired value.

10. A process according to claim 1, wherein the polymer takes the form of a powder, bead, sphere, fibre or other configuration.

11. A process according to claim 1, wherein the silicate solution has a concentration of $SiO_2$ of from 1.0% to 10.0% by weight.

12. A process according to claim 1, wherein the pH of the silicate solution is high enough to prevent the generation of a gel prior to the production of acid from the polymer.

13. A process according to claim 1, wherein the silicate solution further comprises a controlled quantity of a base agent such that the initial pH of the silicate solution is maintained at a high enough level to prevent the generation of a gel prior to the production of acid from the polymer.

14. A process according to claim 13 wherein the base agent is selected from sodium hydroxide and sodium oxide.

15. A process according to claim 1, wherein the silicate gels is formed in a rock formation or an underground reservoir.

16. A process according to claim 15 wherein the underground reservoir is a hydrocarbon or water reservoir.

17. A process method according to claim 16, which process further comprises recovering a hydrocarbon from the reservoir.

18. A process according to claim 16, which process comprises introducing the silicate solution and polymer into the reservoir via a well bore which extends to the reservoir.

19. A process according to claim 18, wherein the well is a producer or injection well.

20. A process according to claim 18, wherein the well bore is vertical, deviated, inclined or horizontal.

21. A process according to claim 15, wherein the polymer also functions as a particulate diverting agent during introduction of the fluid.

22. A process according to claim 15, wherein the formation of the gel reduces the permeability of the formation.

23. A process according to claim 15, wherein the formation of the gel improves the sweep efficiency of water, polymer, surfactant, gas or steam floods.

24. A process according to claim 1, wherein the silicate gel is formed as part of a tunneling operation or as a remedial treatment on a tunnel.

25. A process method according to claim 1, wherein the gel is used in the formation of foundry moulds.

* * * * *